US012705936B2

(12) United States Patent
Wolanyk

(10) Patent No.: US 12,705,936 B2
(45) Date of Patent: Aug. 11, 2026

(54) DATA RETENTION USING NEARBY RESOURCES

(71) Applicant: Micron Technology, Inc., Boise, ID (US)

(72) Inventor: Joshua Wolanyk, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 55 days.

(21) Appl. No.: 18/785,827

(22) Filed: Jul. 26, 2024

(65) Prior Publication Data

US 2025/0131776 A1 Apr. 24, 2025

Related U.S. Application Data

(60) Provisional application No. 63/545,462, filed on Oct. 24, 2023.

(51) Int. Cl.
*G07C 5/00* (2006.01)
*G07C 5/08* (2006.01)

(52) U.S. Cl.
CPC ............. *G07C 5/008* (2013.01); *G07C 5/085* (2013.01)

(58) Field of Classification Search
CPC ................................ G07C 5/008; G07C 5/085
USPC ......................................................... 701/32.2
See application file for complete search history.

(56) References Cited

U.S. PATENT DOCUMENTS

| | | | | | |
|---|---|---|---|---|---|
| 9,558,667 | B2 * | 1/2017 | Bowers | G08G 1/16 |
| 9,798,323 | B2 * | 10/2017 | Tsimhoni | G06Q 50/00 |
| 10,994,728 | B2 * | 5/2021 | Stobbe | B60R 21/0134 |
| 11,620,862 | B1 * | 4/2023 | Serrao | G06T 13/80 345/419 |
| 2017/0017734 | A1 * | 1/2017 | Groh | G06F 30/20 |
| 2020/0023797 | A1 * | 1/2020 | Volos | B60R 21/013 |
| 2020/0192355 | A1 * | 6/2020 | Lu | G08G 1/09675 |
| 2021/0136572 | A1 * | 5/2021 | Ingraham | H04W 12/069 |
| 2021/0304592 | A1 * | 9/2021 | Lepp | H04W 4/40 |
| 2022/0036666 | A1 * | 2/2022 | Mondello | G07C 5/085 |
| 2024/0255645 | A1 * | 8/2024 | Keilaf | G01S 17/931 |
| 2025/0131776 | A1 * | 4/2025 | Wolanyk | G07C 5/085 |

FOREIGN PATENT DOCUMENTS

| | | | | |
|---|---|---|---|---|
| DE | 112023000717 T5 * | 11/2024 | G07C 5/0816 |
| KR | 100532919 B1 * | 12/2005 | G07C 5/085 |

* cited by examiner

*Primary Examiner* — Tyler D Paige
(74) *Attorney, Agent, or Firm* — Schwegman Lundberg & Woessner, P.A.

(57) ABSTRACT

Systems and methods for retaining data related to a detected collision are disclosed including receiving vehicle information from a sensor, receiving information about one or more other vehicles using a communication circuit, receiving an indication of a detected collision, and responsive to the received indication of the detected collision, storing information corresponding to the detected collision from a collision reenactment period in non-volatile memory of the first vehicle and broadcasting the information corresponding to the detected collision using the communication circuit.

20 Claims, 5 Drawing Sheets

DATA RETENTION USING NEARBY RESOURCES

PRIORITY APPLICATION

This application claims the benefit of priority to U.S. Provisional Application Ser. No. 63/545,462, filed Oct. 24, 2023, which is incorporated herein by reference in its entirety.

BACKGROUND

A motor vehicle event data recorder (EDR) is a secure electronic device configured to record information related to a vehicle leading up to, during, and after a detected collision. Collisions can be detected through various mechanisms, such as using data from one or more sensors (e.g., inertial sensors, radar sensors, optical sensors, cameras, etc.). Recorded information related to vehicle can include, among other things, vehicle speed, engine throttle, brake use, steering inputs, changes in velocity or acceleration, driver safety belt use, airbag warning lamp status, airbag deployment time, headlight status, windshield wiper status, vehicle identification code, etc. Once a collision is detected, information related to the crash, such as from a time window before and after the detected collision, can be stored using non-volatile memory of the event data recorder, such that the information related to the crash can be retained even if power is lost during the crash. Stored information can be accessed by authorized parties to analyze the detected collision.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
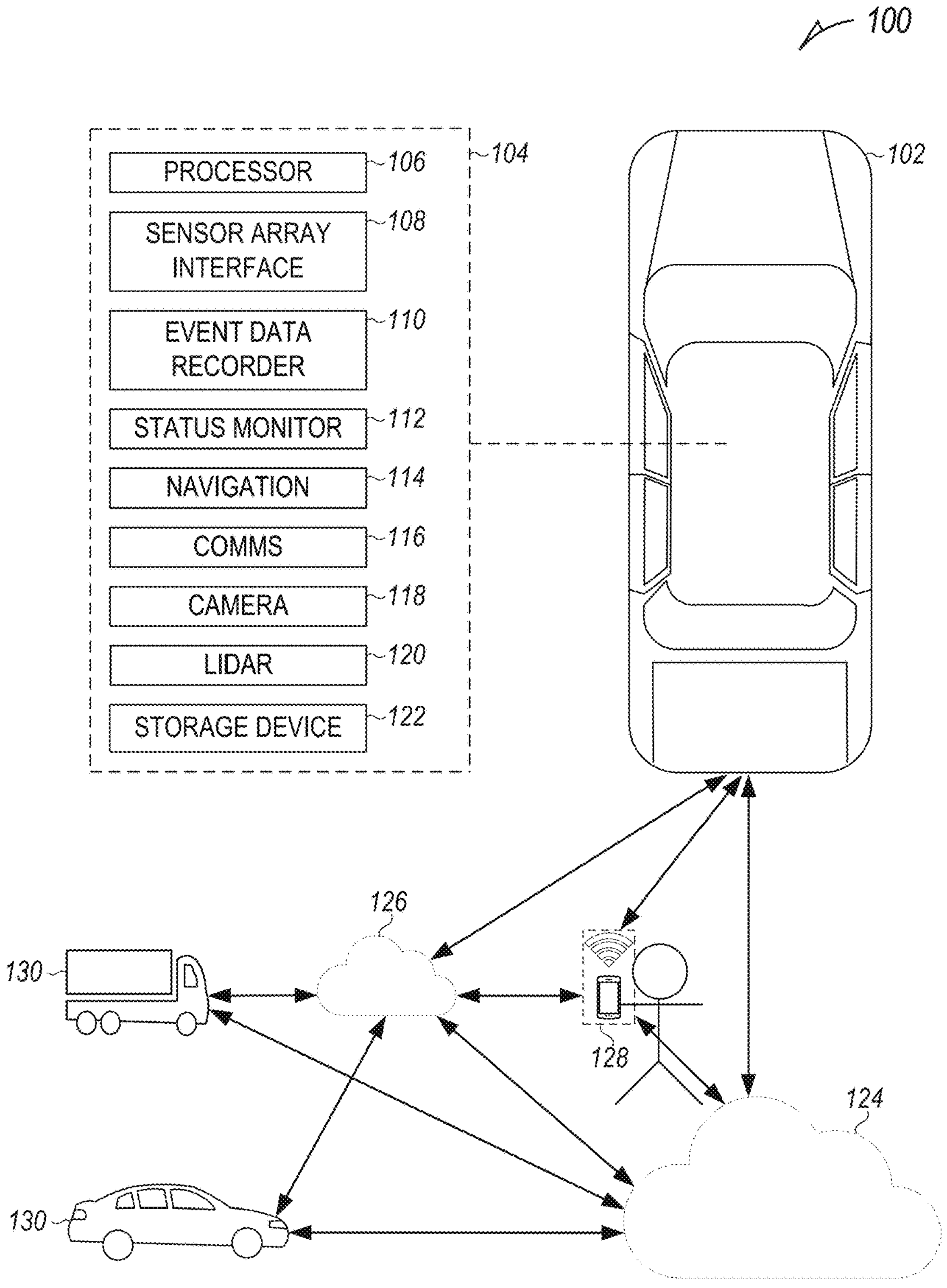
FIG. 1 illustrates an example system comprising a first vehicle.

Wireless ad hoc communication networks, such as vehicle-to-vehicle (V2V) networks between vehicles or vehicle-to-everything (V2X) networks between vehicles and other computing resources (e.g., mobile phones, edge computing resources, etc.), connect resources through wireless connection technologies, including radio frequency or cellular connection technologies, such as dedicated short-range communication (DSRC), cellular vehicle-to-everything (C-V2X), Bluetooth®, Wi-Fi, near-field communication (NFC), low-power WAN (LPWAN), ultra-wideband (UWB), IEEE 802.15.4 (e.g., Zigbee, Z-Wave, Thread, etc.), etc. In certain examples, wireless ad hoc communication networks enable communication between vehicles or computing resources separate from and without connecting to a central cloud networking resource or data center.

Vehicle-to-vehicle communication allows vehicles to broadcast and receive omni-directional messages including information, such as position, heading or direction of travel, and speed data, creating "awareness" of other vehicles and potential hazards in real-time. In certain examples, vehicle-to-vehicle communication systems can alert drivers to the presence of vehicles in blind spots or approaching intersections, to sudden braking or acceleration of surrounding vehicles, or in certain examples can provide advanced warning of objects or hazards, improving line-of-sight visibility and reaction time to changing or hazardous situations.

In other examples, other information can be broadcast to discoverable or connected resources, such as situational or safety information (e.g., detection, determination, or classification of objects (or items) on roadways, heading or direction of travel, braking information, skid or traction control information, identification of possible objects off of a roadway, determination of road conditions, atmospheric conditions, etc.), convenience information (e.g., data or resource sharing), routing information (e.g., self-driving input, navigation instructions, etc.), etc. In addition to position (e.g., coordinates, etc.), heading, and speed data, broadcast information can include acceleration, braking input, number of passengers, delay time, time between cloud connections, data capabilities, or other vehicle information.

However, vehicle information received from or sensed about one or more other vehicles and communicated over one or more wireless ad hoc networks, such as vehicle-to-vehicle communication, etc., is typically stored by a receiving vehicle temporarily, only long enough to be used by the receiving vehicle to determine one or more vehicle inputs for the receiving vehicle.

The present inventors have recognized, among other things, advances in motor vehicle event data recorders, such as to record vehicle information received from or about one or more other vehicles in response to an indication of a detected collision. Existing event data recorders and regulations regarding event data recorder use have several issues. Although motor vehicle event data recorders are common, they are not required for all vehicles. Even when present, motor vehicle event data recorders traditionally only record vehicle information about the vehicle in which the event data recorder is installed, and typically for a limited time, such as 200 ignition cycles, etc. Motor vehicle event data recorders can be damaged or destroyed after an accident or collision, or removed or replaced subsequent during vehicle repair before data can be downloaded and analyzed. In addition, event data recorder information is traditionally limited to a specific subset of vehicle information. In certain examples, modern, more expansive vehicle information can be received and stored, including one or more sensors to monitor a driver attention or fatigue or other information of the vehicle, driver, or passengers, such as autonomous driving input, navigation instructions, etc., or information from one or more sensors facing out of the vehicle, towards one or more other vehicles, including information about the one or more other vehicles, object detection, etc.

In certain examples, responsive to a received indication of a detected collision of a first vehicle, vehicle information about the first vehicle, including that described above, can be broadcast using a communication circuit to one or more vehicles in a communication range of the communication circuit. In such context, "broadcast" includes generally, not to a specific address or recipient or with a specific signal-sending, but instead transmitted generally, through one or more communication methods, such for any receiver within range to receive, read, or interact, including, for example, to upload to the cloud, etc. In one example, "broadcast" can include uploading to the cloud. Additionally, a notification of a detected collision of the first vehicle can be provided to one or more vehicles in the communication range of the communication circuit, such as a second vehicle, and information from a collision reenactment period corresponding to a time of the detected collision can be stored in non-volatile memory, including one or both of information detected by one or more sensors of the one or more vehicles (e.g., the second vehicle) or information received by the one or more vehicles (e.g., the second vehicle) about one or more other vehicles, including the first vehicle or one or more other vehicles within a sensor or communication range of the first vehicle at the time of the detected collision.

Information from or about a first vehicle involved in a collision or a second vehicle within a sensor or communication range of the first vehicle at the time of the collision can be used to determine what happened leading up to or during the collision, including to create a virtual reenactment of the detected collision, such as for insurance, law enforcement, research, or safety regulations purposes, etc. In certain examples, in response to a detected collision, a notification of the detected collision can be broadcast, such as using a communication circuit of the first vehicle or the second vehicle, etc. In certain examples, the notification of the detected collision can include various information, including but not limited to one or more of a vehicle identification of the first vehicle or information determined or estimated using sensor data, such as a time of the detected collision, a geographical location of the detected collision, or in certain examples, information about one or more other vehicles detected within a sensor range of the first vehicle at the time of, before, or shortly after the detected collision (e.g., within two minutes of the detected collision, etc.), etc.

In certain examples, in response to a received notification, vehicle information from a collision reenactment period corresponding to a time of the received notification or the time of the detected collision can be stored in non-volatile memory or otherwise be transitioned from temporary to permanent storage, such as in the non-volatile memory. In an example, the collision reenactment period can include a time period before and up to or including the time of the collision, such as comprising one or more minutes, at least two minutes, or at least five minutes before the time of the collision, and in certain examples the collision reenactment period can additionally include a time period including or following the time of the collision, such as comprising one or more minutes, at least two minutes, or at least five minutes including or following the time of the collision. In certain examples, a longer period, such as at least two or at least five minutes can ensure storage of vehicle information including the detected collision, such as when using the time of the received notification of the detected collision or, for example, after hopping through several vehicles within a distance of the detected collision, such as the sensor range, etc.

FIG. 1 illustrates an example system 100 comprising a first vehicle 102 in a surrounding operating environment. The first vehicle 102 can include a processing platform 104 including a processor system 106, a sensor array interface 108 configured to communicate with one or more sensors (e.g., a camera 118, LiDAR 120, GPS, etc.), an event data recorder 110, a status monitor 112, a communication circuit 116 (e.g., one or more of a receiver, a transmitter, a transceiver, an antenna, an amplifier, a matching circuit, etc.), and a storage device 122 configured to store information, etc. In certain examples, the storage device 122 can include one or more components of the event data recorder 110, or vice versa. In other examples, the storage device 122 and the event data recorder 110 are separate components.

The first vehicle 102 can include a commercial, consumer, or recreation vehicle, such as a car, truck, motorcycle, boat, drone, robot, airplane, helicopter, or any mobile craft able to operate at least partially in an autonomous mode on a roadway or proximate pedestrians or other vehicles or carry passengers, etc. The first vehicle 102 can be configured to operate in one or both of a manual mode, where the driver operates the first vehicle 102 conventionally using pedals, a steering wheel, or other controls, in a fully autonomous mode, where the first vehicle 102 operates without user intervention, or in combinations thereof, such as a semi-autonomous mode, where the first vehicle 102 controls many of the aspects of driving, but the driver may intervene or influence the operation using conventional (e.g., steering wheel) and non-conventional inputs (e.g., voice control).

The processor system 106 can include one or more processors, central processing units (CPU), control circuits, host systems, or one or more other processors or processing circuitry and storage or memory to service the same. In an example, the processing platform 104 or the processor system 106 can include or be configured as a vehicle control circuit configured to control one or more operations of or control inputs to the first vehicle 102. The sensor array interface 108 can provide input or output signaling to the processing platform 104 from one or more sensors of the first vehicle 102.

Examples sensors can include, but are not limited to one or more of microphones, cameras (e.g., forward, side, or rearward facing), radar, LiDAR, laser, ultrasonic, or other sensors. Forward-facing or front-facing is used in this document to refer to the primary direction of travel of the first vehicle 102, the direction that passenger seats are arranged to face, the direction of travel when the transmission is set to drive, etc. Conventionally, rear-facing or rearward-facing can describe sensors that are directed in a roughly opposite direction than those that are forward or front-facing. Side-facing sensors can be directed outward from the sides of the first vehicle 102.

The first vehicle 102 can include one or more other sensors, such as driver identification sensors (e.g., a seat sensor, an eye tracking and identification sensor, a fingerprint scanner, a voice recognition module, etc.), occupant sensors, or various environmental sensors to detect wind velocity, outdoor temperature, barometer pressure, rain/moisture, etc. Sensor data can be used in various contexts, such as to determine vehicle operation, environmental information, road conditions, travel conditions, etc.

The sensor array interface 108 can communicate with one or more other resources of the first vehicle 102 or separate from the first vehicle 102 to provide or obtain sensor data. Components of the processing platform 104 can communicate with components internal to the processing platform 104 or components that are external to the processing platform 104 using one or more networks, which may include local-area networks (LAN), wide-area networks (WAN), wireless networks (e.g., 802.11 or cellular network), ad hoc networks, personal area networks (e.g., Bluetooth®), vehicle-based networks (e.g., Controller Area Network (CAN) BUS), or other combinations or permutations of network protocols and network types. The one or more networks may include a single local area network (LAN) or wide-area network (WAN), or combinations of LANs or WANs, such as the Internet. The various devices coupled to the network may be coupled to the network via one or more wired or wireless connections.

The status monitor 112 can be configured to receive or determine (such as using information from one or more sensors, etc.) a status of one or more aspects of the first vehicle 102, including, for example, tire pressure, oil level, speedometer, safety notifications or warnings, heat, air conditioning, seat position, etc. The navigation system 114 can include a mapping or routing system or other positioning system and components thereof. In addition, the processing platform 104 can include one or more additional systems, such as a security system, an autonomous driving control system (e.g., steering, braking, acceleration, collision avoidance systems, etc.), etc.

In certain examples, the processor system 106 can be configured to control one or more aspects of the communication circuit 116, such as to connect or control access to one or more of a wide area network 124 (e.g., a central cloud network, etc.), an ad hoc network 126 (e.g., a vehicle-to-vehicle or vehicle-to-everything network, etc.), or one or more other wireless data connections. In addition to the first vehicle 102, the system 100 includes a user device 128 and one or more second vehicle 130.

Figure 2:
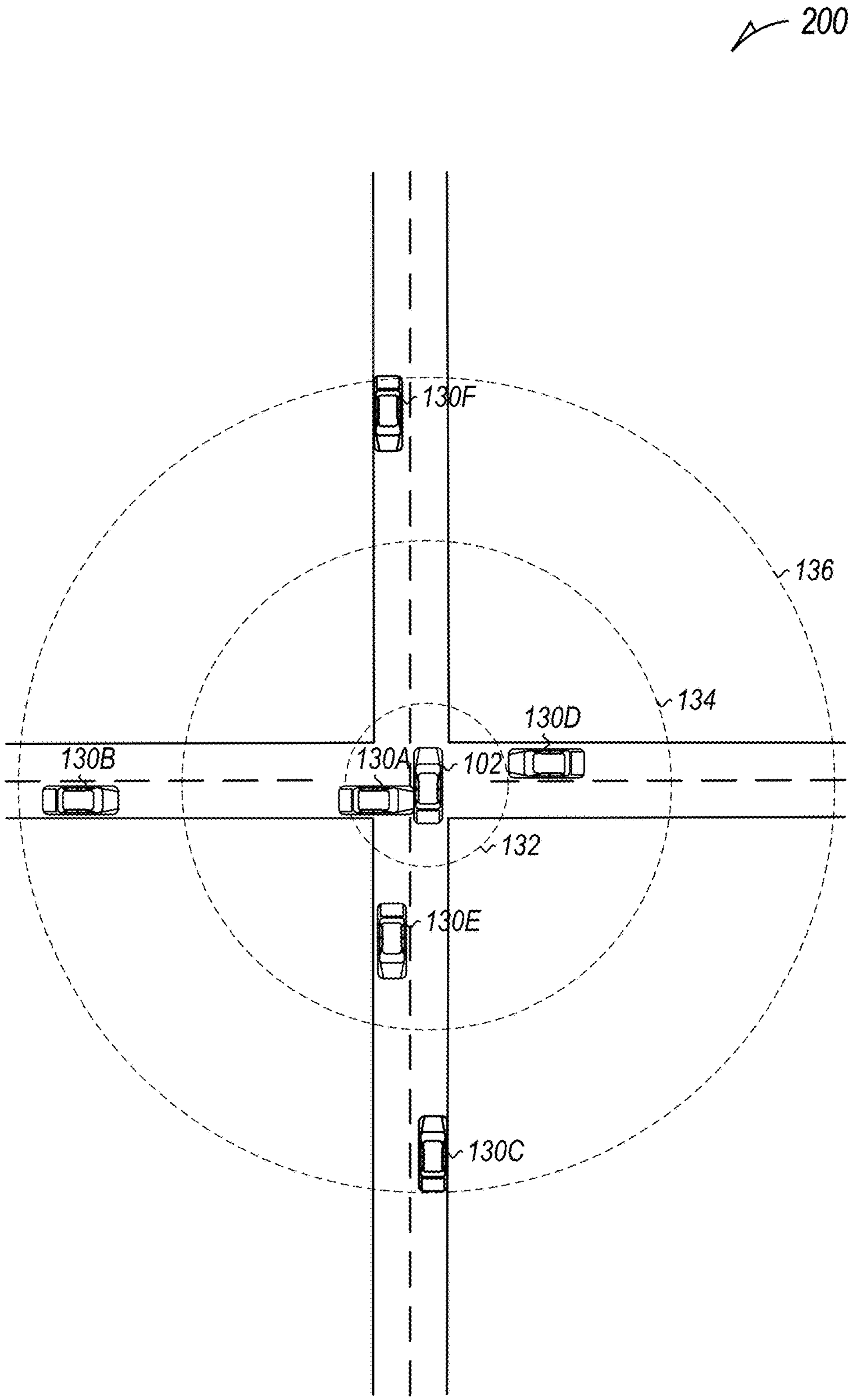
FIG. 2 illustrates an example interaction between vehicles.

FIG. 2 illustrates an example diagram 200 including a first vehicle 102 traveling in a first direction through an intersection of a first roadway (e.g., a two-lane road) and a plurality of second vehicles 130A-130F traveling on the first roadway and a second roadway perpendicular to the first roadway. The example diagram 200 includes a collision between the first vehicle 102 and a first one of the second vehicles 130A in the intersection.

In certain examples, the first vehicle 102 can be configured to receive information from one or more of the second vehicles 130A-130F within a communication range of the first vehicle 102 using a communication circuit 116 through a wireless ad hoc network (e.g., vehicle-to-vehicle network), etc., and sense information about one or more of the second vehicles 130A-130F within a sensor range of the first vehicle 102.

First, second, and third dashed lines 132, 134, 136, centered on the first vehicle 102, illustrate example communication ranges of a communication system or communication circuit 116 of the first vehicle 102. Although illustrated as circular in shape, in certain examples, such as using an omnidirectional antenna, said ranges can include one or more other shapes, for example, using one or more directional antennas, etc. In certain examples, the distance of the communication range can depend, for example, on one or more factors of the communication system, such as a type of communication, a power of one or more components of the communication system (e.g., transmitter circuit, receiver circuit, antenna gain, etc.).

Although not illustrated in FIG. 2, different sensors of the first vehicle 102 can have different sensor ranges depending on a number of factors, for example, depending on whether such sensors are omnidirectional or directional, with respective ranges dependent on hardware, power, or one or more settings or characteristics of respective sensors. For example, individual sensors, such as individual cameras, optical sensors (e.g., LiDAR, laser, etc.), ultrasonic sensors, etc., can be directional, while combinations of directional sensors can provide more omnidirectional coverage.

In this example, the first one of the second vehicles 130A and a second one of the second vehicles 130B were traveling in the same direction on the second roadway and sharing vehicle-to-vehicle information prior to, during, and after the collision. Similarly, a third one of the second vehicles 130C was traveling in the first direction on the first roadway and sharing vehicle-to-vehicle information prior to, during, and after the collision. In addition, a fourth, fifth, and sixth ones of the second vehicles 130D-130F were in position to possibly sense information about one or both of the first vehicle 102 and the first one of the second vehicles 130A prior to, during, or after the collision.

After detecting the collision or receiving an indication of the detected collision, a notification can be provided by one or both of the first vehicle 102 and the first one of the second vehicles 130A that a collision has occurred and, in certain examples, information from a reenactment period sensed from one or more sensors or received from a communication circuit can be broadcast, received, and stored, such as for upload to a cloud network or one or more insurance, law enforcement, research, or safety regulations agency or organization can be stored, such as in non-volatile memory of a storage system or an event data recorder.

In an example, responsive to the detected collision, storing the information from a reenactment period sensed from one or more sensors or received from a communication circuit can include transitioning the information from temporary storage to permanent storage, such as using the event data recorder or the storage system.

For example, after the detected collision between the first vehicle 102 and the first one of the second vehicles 130A, the first vehicle 102 can permanently store and broadcast one or more of information stored in the event data recorder from a reenactment period, information received from one or more other sensors from the reenactment period, and information received from the communication circuit from the reenactment period. Similarly, the first one of the second vehicles 130A can do the same, such that each vehicle has a copy of the other's data corresponding to the detected collision.

Further, although not involved in the collision directly, the second through sixth ones of the second vehicles 130B-130F can receive, permanently store, or broadcast information stored in the event data recorder from the reenactment period, including information received from one or more other sensors from the reenactment period, or information received from the communication circuit from the reenactment period. In certain examples, to broadcast can comprise to upload, using the communication, the stored information to a cloud network or one or more insurance, law enforcement, research, or safety regulations agency or organization for analysis, etc., at this or a later time, such as during a subsequent low-traffic time period (e.g., overnight, etc.).

Figure 3:
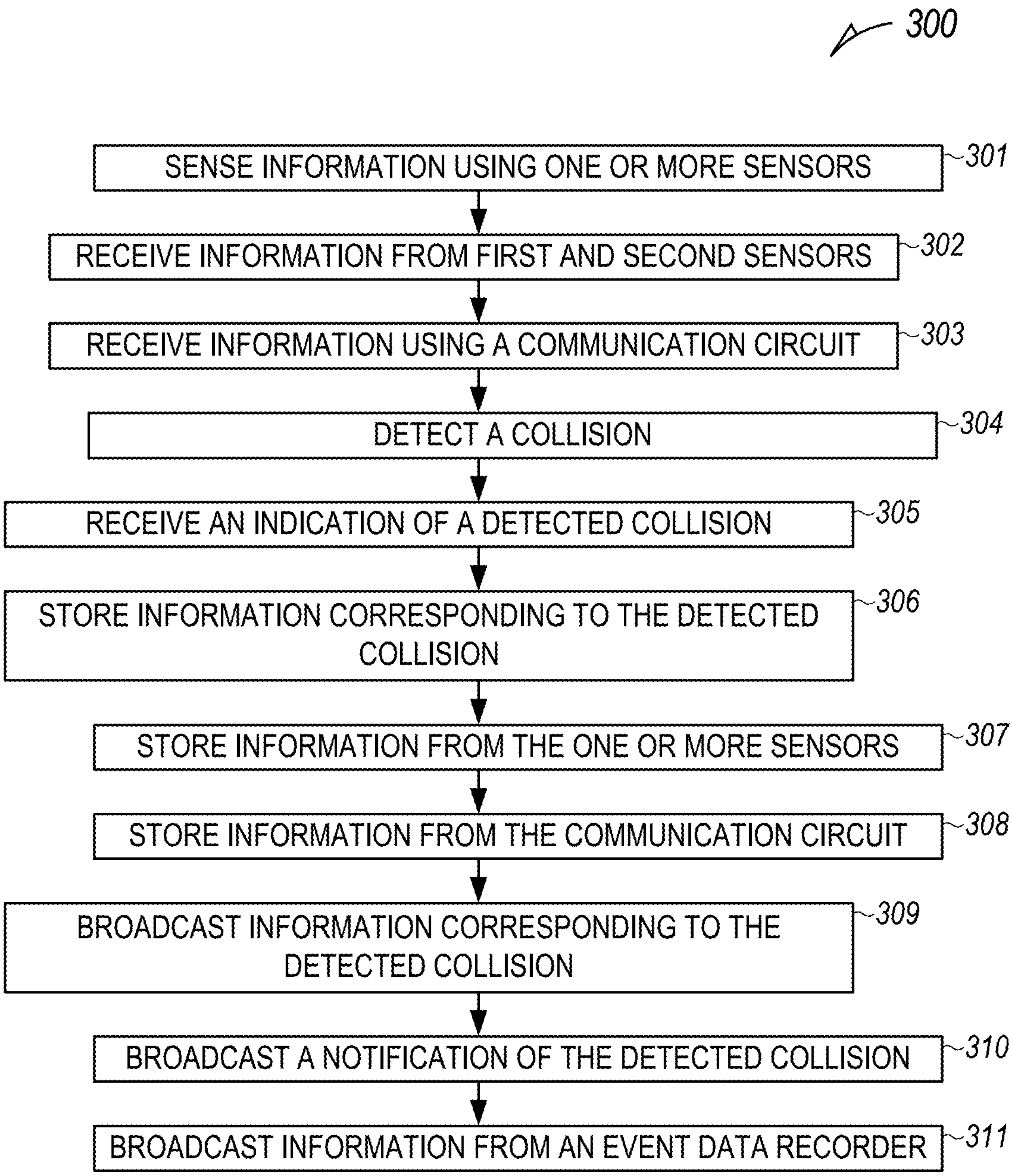
FIG. 3 illustrates an example method for retaining and/or broadcasting data related to at a detected collision.

FIG. 3 illustrates an example method 300 for retaining data related to a detected collision. In an example, the method can include retaining data at a first vehicle related to the detected collision, such as using nearby sources within a communication range of the first vehicle, in certain examples, at the time of the detected collision. In other examples, the method can include retaining data at a second vehicle related to the detected collision, such as after the second vehicle detects or receives a notification of the detected collision.

At step 301, information can be sensed using one or more sensors, such as information about the first vehicle using a first one or more sensors of the first vehicle, information about one or more other vehicles using a second one or more sensors of the first vehicle, or combinations thereof. In an example, information about the first vehicle can include one or more of the types of information described herein, including, for example, one or more of vehicle speed, engine throttle, brake use, steering inputs, changes in velocity or acceleration, driver safety belt use, airbag warning lamp status, airbag deployment time, headlight status, windshield wiper status, vehicle identification code, or one or more other types of information about the first vehicle, etc. Information about the second vehicle sensed or detected using one or more sensors of the first vehicle can include one or more of speed, distance, rate of deceleration, etc., such as detected using one or more external facing sensors of the first vehicle (e.g., LiDAR, optical, ultrasonic, laser, radar, etc.), etc.

At step 302, information can be received from the one or more sensors, including information from first and second sensors of the first vehicles. In an example, the first sensor can be configured to sense information about the first vehicle, and the second sensor can be configured to sense information about one or more second vehicles separate from the first vehicle. In certain examples, the first and second sensors can be configured to sense information and provide the vehicle information, such as to a sensor array interface or one or more other components of the processing platform 104. Accordingly, the processing platform or one or more components thereof, such as the processor system, can receive the information from the one or more sensors.

At step 303, information can be received using a communication circuit, such as information sensed from one or more sensors of a second vehicle or one or more other vehicles. In an example, the information sensed from the second vehicle can include information about the second vehicle. In other examples, the information sensed from the second vehicle can include information sensed by one or more sensors of the second vehicle about one or more other vehicles, such as, for example, the first vehicle, etc. In an example, receiving vehicle information can include receiving vehicle-to-vehicle information from the one or more vehicles in a vehicle-to-vehicle network using the communication circuit.

At step 304, a collision can be detected, such as of the first vehicle using information from one or more sensors of the first vehicle or of one or more sensors from one or more other vehicles and a comparison to one or more collision thresholds. In an example, a time of the detected collision can be determined, such as using a time of the sensor information that exceeds the one or more collision thresholds. If the data from the one or more sensors is not time stamped, the time of the detected collision can be set as a time that the detected collision is determined by the one or more sensors or one or more components of the processing platform, etc.

At step 305, an indication of a detected collision can be received, such as an indication of the collision detected at step 304 from the first vehicle, or an indication of a detected collision from a second vehicle received using the communication circuit through a wireless ad hoc network, a vehicle-to-vehicle network, etc. In certain examples, one or more components of the processor platform, such as the processor system 106, etc., can detect the collision or receive the indication of the detected collision.

At step 306, information corresponding to the detected collision can be stored, such as information corresponding to the detected collision from a collision reenactment period. In certain examples, the information corresponding to the detected collision can be stored in non-volatile memory of the first vehicle, such as in response to the received indication of the detected collision at step 305. In an example, the non-volatile memory can include non-volatile memory of the event data recorder, the storage system, or combinations thereof. In certain examples, the information corresponding to the detected collision can include one or more of information corresponding to the detected collision from the first vehicle, information corresponding to the detected collision from the second vehicle, information from the second vehicle from the collision reenactment period, or combinations thereof. Further, the collision reenactment period can include a time period starting at least one minute (e.g., at least two minutes, at least 5 minutes, etc.) before and ending at least one minute (e.g., at least two minutes, at least 5 minutes, etc.) after a time of the detected collision.

In an example, storing information corresponding to the detected collision can include transitioning information corresponding to the detected collision from temporary to permanent storage in the non-volatile memory. In certain examples, the transition can be triggered by the received indication of the detected collision.

In certain examples, storing information corresponding to the detected collisions at step 306 can include performing one or more of steps 307 or 308. At step 307, information from the one or more sensors can be stored, such as one or more of information corresponding to the detected collision from the first vehicle, information corresponding to the detected collision from the second vehicle, or combinations thereof. At step 308, information from the communication circuit can be stored, such as information received from the second vehicle from the collision reenactment period.

At step 309, information corresponding to the detected collision can be broadcast using the communication circuit, such as to one or more other vehicles, wireless resources, a central cloud network component, etc. In an example, the information corresponding to the detected collision to be broadcast can include the stored information corresponding to the detected collision. Further, broadcasting the information corresponding to the detected collision can include broadcasting the information to one or more vehicles coupled to the communication circuit of the first vehicle or uploading the information corresponding to the detected collision to a cloud network.

In certain examples, broadcasting information corresponding to the detected collision at step 309 can include performing one or more of steps 310 or 311. At step 310, a notification of the detected collision can be broadcast, such as to other vehicles within a communication range of the communication circuit of the first vehicle. At step 311, information from an event data recorder can be broadcast, such as information from an event time window of the event data recorder corresponding to the detected collision, using the communication circuit of the first vehicle. In an example, the event time window can include a period of time leading up to a detected collision, typically less than one minute, such as between 5 and 30 seconds, etc. In an example, information can be broadcast for a first period following the detected collision, where the first period is longer than the event time window. For example, the first period can include a period configured to enable one or more other vehicles or other resources to receive the broadcast information, such as a period greater than five minutes, greater than 30 minutes, greater than two hours, including a period of a day, etc.

Although described herein with respect to an order of steps from step 301 to 311, in certain examples any one or more of such steps described herein can be omitted, or various combinations of steps can be combined or reordered in various combinations or subcombinations of steps in the presented or one or more different orders.

Figure 4:
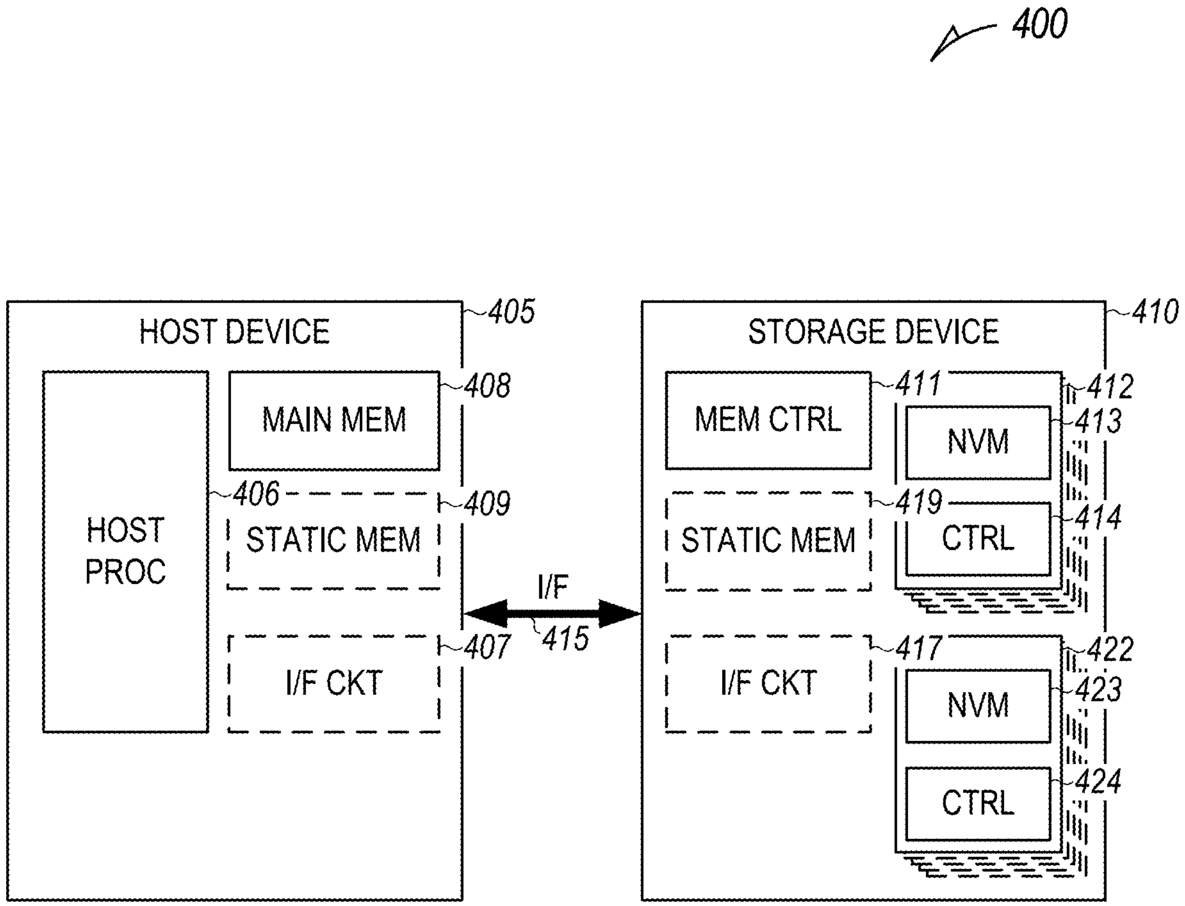
FIG. 4 illustrates an example system including a host device and a storage device.

FIG. 4 illustrates an example system 400 (e.g., a host system or processor system) including a host device 405 and a storage device 410 configured to communicate over a communication interface (I/F) 415 (e.g., a bidirectional parallel or serial communication interface). In an example, the communication interface 415 can be referred to as a host interface. The host device 405 can include a host processor 406 (e.g., a host central processing unit (CPU) or other processor or processing circuitry, such as a memory management unit (MMU), interface circuitry, etc.). In certain examples, the host device 405 can include a main memory (MAIN MEM) 408 (e.g., DRAM, etc.) and optionally, a static memory (STATIC MEM) 409, to support operation of the host processor (HOST PROC) 406.

The storage device 410 can include a non-volatile memory device, in certain examples, a single device separate from the host device 405 and components of the host device 405 (e.g., including components illustrated in FIG. 4), in other examples, a component of the host device 405, and in yet other examples, a combination of separate discrete components. For example, the communication interface 415 can include a serial or parallel bidirectional interface, such as defined in one or more Joint Electron Device Engineering Council (JEDEC) standards.

The storage device 410 can include a memory controller (MEM CTRL) 411 and a first non-volatile memory device 412. The memory controller 411 can optionally include a limited amount of static memory 419 (or main memory) to support operations of the memory controller 411. In an example, the first non-volatile memory device 412 can include a number of non-volatile memory devices (e.g., dies or LUNs), such as one or more stacked flash memory devices (e.g., as illustrated with the stacked dashes underneath the first non-volatile memory device 412), etc., each including non-volatile memory (NVM) 413 (e.g., one or more groups of non-volatile memory cells) and a device controller (CTRL) 414 or other periphery circuitry thereon (e.g., device logic, etc.), and controlled by the memory controller 411 over an internal storage-system communication interface (e.g., an Open NAND Flash Interface (ONFI) bus, etc.) separate from the communication interface 415. Control circuitry, as used herein, can refer to one or more of the memory controller 411, the device controller 414, or other periphery circuitry in the storage device 410, the NVM device 412, etc.

Flash memory devices typically include one or more groups of one-transistor, floating gate (FG) or replacement gate (RG) (or charge trapping) storage structures (memory cells). The memory cells of the memory array are typically arranged in a matrix. The gates of each memory cell in a row of the array are coupled to an access line (e.g., a word line). In NOR architecture, the drains of each memory cell in a column of the array are coupled to a data line (e.g., a bit line). In NAND architecture, the drains of each memory cell in a column of the array are coupled together in series, source to drain, between a source line and a bit line.

Each memory cell in a NOR, NAND, 3D XPoint, FeRAM, MRAM, or one or more other architecture semiconductor memory array can be programmed individually or collectively to one or a number of programmed states. A single-level cell (SLC) can represent one bit of data per cell in one of two programmed states (e.g., 1 or 0). A multi-level cell (MLC) can represent two or more bits of data per cell in a number of programmed states (e.g., $2^n$, where n is the number of bits of data). In certain examples, MLC can refer to a memory cell that can store two bits of data in one of 4 programmed states. A triple-level cell (TLC) can represent three bits of data per cell in one of 8 programmed states. A quad-level cell (QLC) can represent four bits of data per cell in one of 16 programmed states. In other examples, MLC can refer to any memory cell that can store more than one bit of data per cell, including TLC and QLC, etc.

In three-dimensional (3D) architecture semiconductor memory device technology, memory cells can be stacked, increasing the number of tiers, physical pages, and accordingly, the density of memory cells in a memory device. Data is often stored arbitrarily on the storage system as small units. Even if accessed as a single unit, data can be received in small, random 4-16 k single file reads (e.g., 60%-80% of operations are smaller than 16k). It is difficult for a user and even kernel applications to indicate that data should be stored as one sequential cohesive unit. File systems are typically designed to optimize space usage, and not sequential retrieval space.

The memory controller 411, separate from the host processor 406 and the host device 405, can receive instructions from the host device 405, and can communicate with the first non-volatile memory device 412, such as to transfer data to (e.g., write or erase) or from (e.g., read) one or more of the memory cells of the first non-volatile memory device 412. The memory controller 411 can include, among other things, circuitry or firmware, such as a number of components or integrated circuits. For example, the memory controller 411 can include one or more memory control units, circuits, or components configured to control access across the memory array and to provide a translation layer between the host device 405 and the storage system 400, such as a memory manager, one or more memory management tables, etc.

In an example, the storage device 410 can include a second non-volatile memory device 422, separate from the first non-volatile memory device 412, the second non-volatile memory device 422 can include a number of non-volatile memory devices, etc., each including non-volatile memory 423 and a device controller 424 or other periphery circuitry thereon, and controlled by the memory controller 411 over an internal storage-system communication interface separate from the communication interface 415. In an example, the first non-volatile memory device 412 can be configured as a "cold tier" memory device and the second non-volatile memory device 422 can be configured as a "warm tier" memory device (while the main memory 408, the static memory 409, the static memory 419 (or main memory) can be configured as a "hot tier" memory). In an example, temporary storage, as used herein, can include volatile memory, a "hot tier" memory device, or one or more of the main memory 408, the static memory 409, the static memory 419, or one or more other faster type of memory. In contrast, permanent storage, as used herein, can include non-volatile memory, a "cold tier" memory device, or a non-volatile memory device, such as the first non-volatile memory device 412. In an example, the "warm tier" memory device can be either temporary or permanent storage, if available, depending on system capacity.

The memory manager can include, among other things, circuitry or firmware, such as a number of components or integrated circuits associated with various memory management functions, including, among other functions, wear leveling (e.g., garbage collection or reclamation), error detection or correction, block retirement, or one or more other memory management functions. The memory manager can parse or format host commands (e.g., commands received from the host device 405) into device commands (e.g., commands associated with operation of a memory array, etc.), or generate device commands (e.g., to accomplish various memory management functions) for the device controller 414 or one or more other components of the storage device 410.

The memory manager can include a set of management tables configured to maintain various information associated with one or more component of the storage device 410 (e.g., various information associated with a memory array or one or more memory cells coupled to the memory controller 411). For example, the management tables can include information regarding block age, block erase count, error history, or one or more error counts (e.g., a write operation error count, a read bit error count, a read operation error count, an erase error count, etc.) for one or more blocks of memory cells coupled to the memory controller 411. In certain examples, if the number of detected errors for one or more of the error counts is above a threshold, the bit error can be referred to as an uncorrectable bit error. The management tables can maintain a count of correctable or uncorrectable bit errors, among other things. In an example, the management tables can include translation tables or a L2P mapping.

The memory manager can implement and use data structures to reduce storage device 410 latency in operations that involve searching L2P tables for valid pages, such as garbage collection. To this end, the memory manager is arranged to maintain a data structure (e.g., table region data structure, tracking data structure, etc.) for a physical block. The data structure includes indications of L2P mapping table regions, of the L2P table. In certain examples, the data structure is a bitmap (e.g., a binary array). In an example, the bitmap includes a bit for each region of multiple, mutually exclusive, regions that span the L2P table.

The first non-volatile memory device 412 or the non-volatile memory 413 (e.g., one or more 3D NAND architecture semiconductor memory arrays) can include a number of memory cells arranged in, for example, a number of devices, planes, blocks, physical pages, super blocks, or super pages. As one example, a TLC memory device can include 18,592 bytes (B) of data per page, 1536 pages per block, 548 blocks per plane, and 4 planes per device. As another example, an MLC memory device can include 18,592 bytes (B) of data per page, 1024 pages per block, 548 blocks per plane, and 4 planes per device, but with half the required write time and twice the program/erase (P/E) cycles as a corresponding TLC memory device. Other examples can include other numbers or arrangements. A super block can include a combination of multiple blocks, such as from different planes, etc., and a window can refer to a stripe of a super block, typically matching a portion covered by a physical-to-logical (P2L) table chunk, etc., and a super page can include a combination of multiple pages.

The term "super" can refer to a combination or multiples of a thing or things. For examples, a super block can include a combination of blocks. If a memory device includes 4 planes, a super block may refer to the same block on each plane, or a pattern of blocks across the panes (e.g., a combination of block 0 on plane 0, block 1 on plane 1, block 2 on plane 2, and block 3 on plane 3, etc.). In an example, if a storage system includes multiple memory devices, the combination or pattern of blocks can extend across the multiple memory devices. The term "stripe" can refer to a pattern of combination or pattern of a piece or pieces of a thing or things. For example, a stripe of a super block can refer to a combination or pattern of pages from each block in the super block.

In operation, data is typically written to or read from the storage device 410 in pages and erased in blocks. However, one or more memory operations (e.g., read, write, erase, etc.) can be performed on larger or smaller groups of memory cells, as desired. For example, a partial update of tagged data from an offload unit can be collected during data migration or garbage collection to ensure it was re-written efficiently. The data transfer size of a memory device is typically referred to as a page, whereas the data transfer size of a host device is typically referred to as a sector. Although a page of data can include a number of bytes of user data (e.g., a data payload including a number of sectors of data) and its corresponding metadata, the size of the page often refers only to the number of bytes used to store the user data. As an example, a page of data having a page size of 4 kB may include 4 kB of user data (e.g., 8 sectors assuming a sector size of 512 B) as well as a number of bytes (e.g., 32 B, 54 B, 224 B, etc.) of auxiliary or metadata corresponding to the user data, such as integrity data (e.g., error detecting or correcting code data), address data (e.g., logical address data, etc.), or other metadata associated with the user data.

Different types of memory cells or memory arrays can provide for different page sizes or may require different amounts of metadata associated therewith. For example, different memory device types may have different bit error rates, which can lead to different amounts of metadata necessary to ensure integrity of the page of data (e.g., a memory device with a higher bit error rate may require more bytes of error correction code (ECC) data than a memory device with a lower bit error rate). As an example, an MLC NAND flash device may have a higher bit error rate than a corresponding SLC NAND flash device. As such, the MLC device may require more metadata bytes for error data than the corresponding SLC device.

In an example, the data in a chunk or data unit can be managed in an optimized manner throughout its tenure on the storage system. For example, the data is managed as one unit during data migration (e.g., garbage collection, etc.) such that the efficient read/write properties are preserved as data is moved to its new physical location on the storage system. In certain examples, the only limit to the number of chunks, data units, or blocks configurable for storage, tagging, etc., are the capacities of the system.

One or more of the host device 405 or the storage device 410 can include interface circuitry, such as a host interface circuit (I/F CKT) 407 or a storage interface circuit (I/F CKT) 417, configured to enable communication between components of the host system 400. Each interface circuit can include one or more interconnect layers, such as mobile industry processor interface (MIPI) Unified Protocol (UniPro) and M-PHY layers (e.g., physical layers), including circuit components and interfaces. The M-PHY layer includes the differential transmit (TX) and receive (RX) signaling pairs (e.g., DIN_t, DIN_c and DOUT_t, DOUT_c, etc.). In certain examples, the host interface circuit 407 can include a controller (e.g., a UFS controller), a driver circuit (e.g., a UFS driver), etc. Although described herein with respect to the UniPro and M-PHY layers, one or more other set of circuit components or interfaces can be used to transfer data between circuit components of the host system 400.

Components of the host system 400 can be configured to receive or operate using one or more host voltages, including, for example, VCC, VCCQ, and, optionally, VCCQ2. In certain examples, one or more of the host voltages, or power rails, can be managed or controlled by a power management integrated circuit (PMIC). In certain examples, VCC can be a first supply voltage (e.g., 2.4V-3.3V, 1.4V-1.95V, etc.). In an example, one or more of the static memory 419 or the non-volatile memory devices 412 can require VCC for operation. VCCQ can be a second supply voltage, lower than the VCC (e.g., 1.1V-1.3V, etc.). In an example, one or more of the memory controller 411, the communication interface 415, or memory I/O or other low voltage blocks can optionally require VCCQ for operation. VCCQ2 can be a third supply voltage between VCC and VCCQ (e.g., 1.4V-1.95V, etc.). In an example, one or more of the memory controller 411 of the communication interface, or other low voltage block can optionally require VCCQ2. Each host voltage can be set to provide voltage at one or more current levels, in certain examples, controllable by one or more device descriptors and levels (e.g., between [0:15], each representing a different maximum expected source current, etc.).

Figure 5:
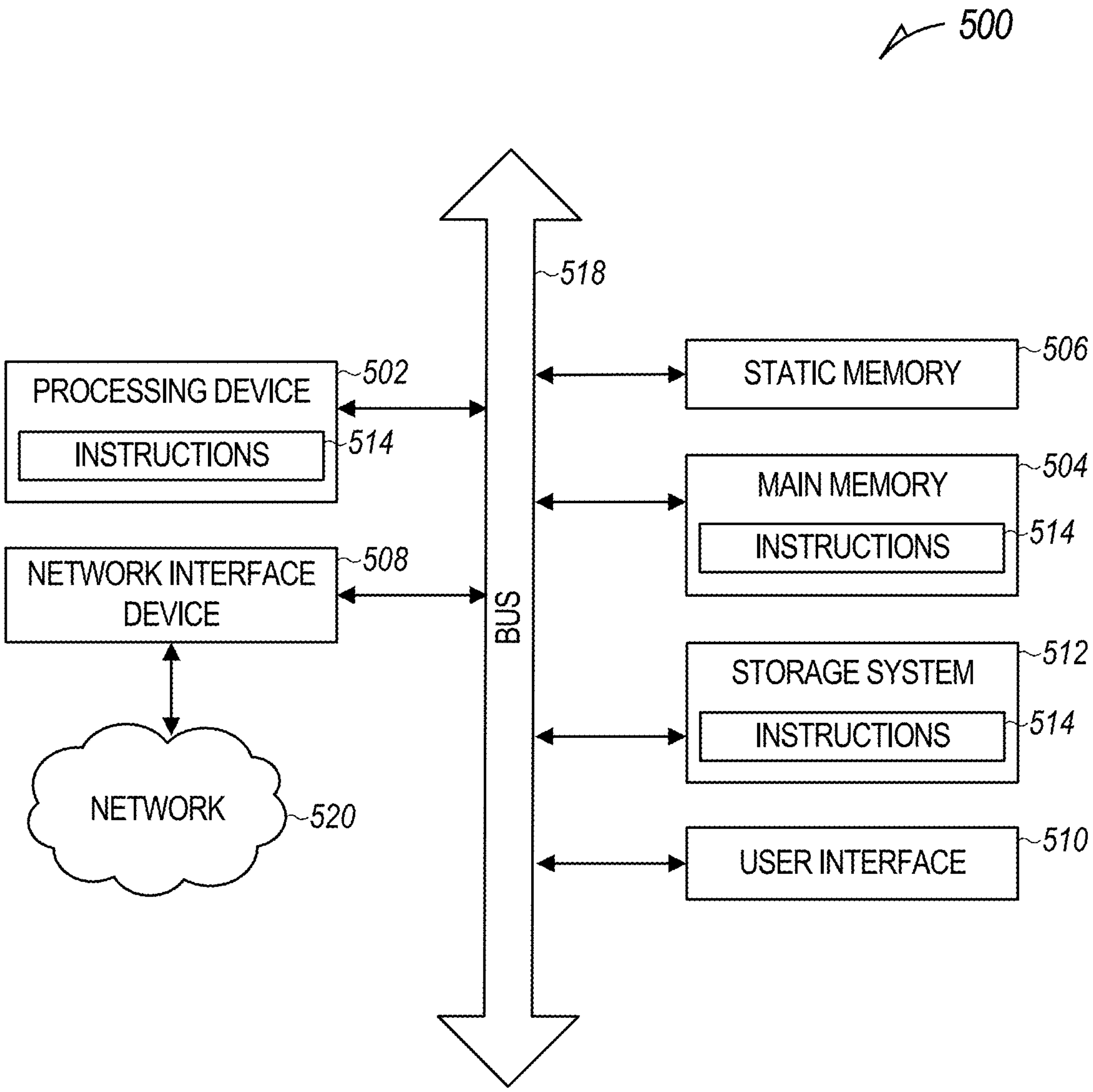
FIG. 5 illustrates a block diagram of an example machine upon which any one or more of the techniques discussed herein may perform.

FIG. 5 illustrates a block diagram of an example machine 500 (e.g., a host system, a user device, a server, etc.) upon which any one or more of the techniques (e.g., methodologies) discussed herein may perform. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may function as a peer machine in peer-to-peer (P2P) (or other distributed) network environment. The machine 500 may be a personal computer (PC), a tablet PC, a set-top box (STB), a personal digital assistant (PDA), a mobile telephone, a web appliance, an IoT device, automotive system, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic, components, devices, packages, or mechanisms. Circuitry is a collection (e.g., set) of circuits implemented in tangible entities that include hardware (e.g., simple circuits, gates, logic, etc.). Circuitry membership may be flexible over time and underlying hardware variability. Circuitries include members that may, alone or in combination, perform specific tasks when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer-readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable participating hardware (e.g., the execution units or a loading mechanism) to create members of the circuitry in hardware via the variable connections to carry out portions of the specific tasks when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

The machine 500 (e.g., computer system, a host system, etc.) may include a processing device 502 (e.g., a hardware processor, a central processing unit (CPU), a graphics processing unit (GPU), a hardware processor core, or any combination thereof, etc.), a main memory 504 (e.g., read-only memory (ROM), dynamic random-access memory (DRAM), a static memory 506 (e.g., static random-access memory (SRAM), etc.), and a storage system 512, some or all of which may communicate with each other via a communication interface 518 (e.g., a bus).

The processing device 502 can represent one or more general-purpose processing devices such as a microprocessor, a central processing unit, etc. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 502 can also be one or more special-purpose processing devices such as an application specific integrated circuit (ASIC), a field programmable gate array (FPGA), a digital signal processor (DSP), network processor, etc. The processing device 502 can be configured to execute instructions 514 for performing the operations and steps discussed herein. The machine 500 can further include a network interface device 508 to communicate over a network 520.

The storage system 512 can include a machine-readable storage medium (also known as a computer-readable medium) on which is stored one or more sets of instructions 514 or software embodying any one or more of the methodologies or functions described herein. The instructions 514 can also reside, completely or at least partially, within the main memory 504 or within the processing device 502 during execution thereof by the machine 500, the main memory 504 and the processing device 502 also constituting machine-readable storage media.

The term "machine-readable storage medium" should be taken to include a single medium or multiple media that store the one or more sets of instructions, or any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media. In an example, a massed machine-readable medium comprises a machine-readable medium with a plurality of particles having invariant (e.g., rest) mass. Accordingly, massed machine-readable media are not transitory propagating signals. Specific examples of massed machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The machine 500 may further include a user interface 510, such as one or more of a display unit, an alphanumeric input device (e.g., a keyboard), and a user interface (UI) navigation device (e.g., a mouse), etc. In an example, one or more of the display unit, the input device, or the UI navigation device may be a touch screen display. The machine a signal generation device (e.g., a speaker), or one or more sensors, such as a global positioning system (GPS) sensor, compass, accelerometer, or one or more other sensor. The machine 500 may include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The instructions 514 (e.g., software, programs, an operating system (OS), etc.) or other data are stored on the storage system 512 can be accessed by the main memory 504 for use by the processing device 502. The main memory 504 (e.g., DRAM) is typically fast, but volatile, and thus a different type of storage than the storage system 512 (e.g., an SSD), which is suitable for long-term storage, including while in an "off" condition. The instructions 514 or data in use by a user or the machine 500 are typically loaded in the main memory 504 for use by the processing device 502. When the main memory 504 is full, virtual space from the storage system 512 can be allocated to supplement the main memory 504; however, because the storage system 512 device is typically slower than the main memory 504, and write speeds are typically at least twice as slow as read speeds, use of virtual memory can greatly reduce user experience due to storage system latency (in contrast to the main memory 504, e.g., DRAM). Further, use of the storage system 512 for virtual memory can greatly reduce the usable lifespan of the storage system 512.

The instructions 514 may further be transmitted or received over a network 520 using a transmission medium via the network interface device 508 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 502.11 family of standards known as Wi-Fi®, IEEE 502.16 family of standards known as WiMax®), IEEE 502.15.4 family of standards, peer-to-peer (P2P) networks, among others. In an example, the network interface device 508 may include one or more physical jacks (e.g., Ethernet, coaxial, or phone jacks) or one or more antennas to connect to the network 520. In an example, the network interface device 508 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 500, and includes digital or analog communications signals or other intangible medium to facilitate communication of such software.

The above detailed description includes references to the accompanying drawings, which form a part of the detailed description. The drawings show, by way of illustration, specific embodiments in which the invention can be practiced. These embodiments are also referred to herein as examples. Such examples can include elements in addition to those shown or described. However, the present inventor also contemplates examples in which only those elements shown or described are provided. Moreover, the present inventor also contemplates examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein". Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

In various examples, the components, controllers, processors, units, engines, or tables described herein can include, among other things, physical circuitry or firmware stored on a physical device. As used herein, "processor" means any type of computational circuit such as, but not limited to, a microprocessor, a microcontroller, a graphics processor, a digital signal processor (DSP), or any other type of processor or processing circuit, including a group of processors or multi-core devices.

As used herein, directional adjectives, such as horizontal, vertical, normal, parallel, perpendicular, etc., can refer to relative orientations, and are not intended to require strict adherence to specific geometric properties, unless otherwise noted. It will be understood that when an element is referred to as being "on," "connected to" or "coupled with" another element, it can be directly on, connected, or coupled with the other element or intervening elements may be present. In contrast, when an element is referred to as being "directly on," "directly connected to" or "directly coupled with" another element, there are no intervening elements or layers present. If two elements are shown in the drawings with a line connecting them, the two elements can be either be coupled, or directly coupled, unless otherwise indicated.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, etc. Such code can include computer readable instructions for performing various methods. The code may form portions of computer program products. Further, the code can be tangibly stored on one or more volatile or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

A processor subsystem may be used to execute the instruction on the—readable medium. The processor subsystem may include one or more processors, each with one or more cores. Additionally, the processor subsystem may be disposed on one or more physical devices. The processor subsystem may include one or more specialized processors, such as a graphics processing unit (GPU), a digital signal processor (DSP), a field programmable gate array (FPGA), or a fixed function processor.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

As used in any embodiment herein, the term "logic" may refer to firmware or circuitry configured to perform any of the aforementioned operations. Firmware may be embodied as code, instructions or instruction sets, as data hard-coded (e.g., nonvolatile) in memory devices or circuitry, or combinations thereof.

"Circuitry," as used in any embodiment herein, may comprise, for example, any combination or permutation of hardwired circuitry, programmable circuitry, state machine circuitry, logic, or firmware that stores instructions executed by programmable circuitry. The circuitry may be embodied as an integrated circuit, such as an integrated circuit chip. In some embodiments, the circuitry may be formed, at least in part, by the processor circuitry executing code or instruction sets (e.g., software, firmware, etc.) corresponding to the functionality described herein, thus transforming a general-purpose processor into a specific-purpose processing environment to perform one or more of the operations described herein. In some embodiments, the processor circuitry may be embodied as a stand-alone integrated circuit or may be incorporated as one of several components on an integrated circuit. In some embodiments, the various components and circuitry of the node or other systems may be combined in a system-on-a-chip (SoC) architecture.

Example 1 is a method for retaining data at a first vehicle related to a detected collision, comprising: receiving first vehicle information about the first vehicle from a first sensor of the first vehicle; receiving second vehicle information about a second vehicle from a second sensor of the first vehicle; receiving information from the second vehicle using a communication circuit of the first vehicle; receiving an indication of a detected collision of the first vehicle or the second vehicle; and responsive to the received indication of the detected collision: storing information corresponding to the detected collision from a collision reenactment period in non-volatile memory of the first vehicle; and broadcasting the information corresponding to the detected collision using the communication circuit, wherein the information corresponding to the detected collision comprises first vehicle information, second vehicle information, and information from the second vehicle from the collision reenactment period, wherein the collision reenactment period comprises a period starting at least one minute before and ending at least one minute after a time of the detected collision.

In Example 2, the subject matter of Example 1 optionally comprises: sensing first vehicle information about the first vehicle using the first sensor; and sensing second vehicle information about the second vehicle using the second sensor, wherein receiving the indication of the detected collision comprises detecting a collision of the first vehicle using the first sensor or receiving an indication of a detected collision of the second vehicle using the communication circuit.

In Example 3, the subject matter of any of Examples 1-2 optionally comprises wherein storing information corresponding to the detected collision from the collision reenactment period in non-volatile memory of the first vehicle comprises transitioning information corresponding to the detected collision from temporary to permanent storage in the non-volatile memory, wherein the transition is triggered by the received indication of the detected collision.

In Example 4, the subject matter of any of Examples 1-3 optionally comprises wherein broadcasting the information corresponding to the detected collision includes broadcasting the information corresponding to the detected collision to one or more vehicles coupled to the communication circuit of the first vehicle or uploading the information corresponding to the detected collision to a cloud network.

Example 5 is a method for retaining data related to a detected collision of a first vehicle using nearby resources, comprising: receiving an indication of a detected collision of the first vehicle; and responsive to the received indication of the detected collision of the first vehicle: storing vehicle information of the first vehicle corresponding to the detected collision using an event data recorder; and broadcasting information corresponding to the detected collision using a communication circuit of the first vehicle.

In Example 6, the subject matter of Example 5 optionally comprises wherein broadcasting information corresponding to the detected collision comprises broadcasting a notification of the detected collision to other vehicles within a communication range of the communication circuit of the first vehicle.

In Example 7, the subject matter of any of Examples 5-6 optionally comprises wherein broadcasting information corresponding to the detected collision comprises broadcasting information from the event data recorder from an event time window corresponding to the detected collision using the communication circuit of the first vehicle.

In Example 8, the subject matter of Example 7 optionally comprises wherein broadcasting information from the event data recorder corresponding to the detected collision using the communication circuit comprises broadcasting information for a first period following the detected collision.

In Example 9, the subject matter of Example 8 optionally comprises wherein the event time window corresponding to the detected collision is less than the first period following the detected collision.

In Example 10, the subject matter of any of Examples 7-9 optionally comprises comprising: detecting a collision of the first vehicle using information from one or more sensors of the first vehicle; and responsive to the detected collision, storing vehicle information from the event time window corresponding to the detected collision in non-volatile memory, wherein the vehicle information comprises information from the one or more sensors of the first vehicle, wherein broadcasting information corresponding to the detected collision comprises broadcasting information from the one or more sensors of the first vehicle.

In Example 11, the subject matter of any of Examples 5-10 optionally comprises comprising: communicating with one or more vehicles within a communication range of the communication circuit, wherein broadcasting information from the event data recorder corresponding to the detected collision comprises broadcasting information to one or more vehicles coupled to the communication circuit of the first vehicle at a time of the detected collision, wherein the nearby resources comprise the one or more vehicles coupled to the communication circuit at the time of the detected collision.

Example 12 is a method for retaining data at a second vehicle related to a detected collision, comprising: receiving vehicle information from one or more vehicles separate from the second vehicle using a communication circuit; receiving an indication of a detected collision from at least one of the one or more vehicles; and responsive to the received indication of the detected collision from the one or more vehicles, storing information from a collision reenactment period corresponding to a time of the detected collision in non-volatile memory.

In Example 13, the subject matter of Example 12 optionally comprises wherein storing information from the collision reenactment period corresponding to the time of the detected collision in non-volatile memory comprises transitioning information from the collision reenactment period from temporary to permanent storage in the non-volatile memory.

In Example 14, the subject matter of any of Examples 12-13 optionally comprises wherein storing information from the collision reenactment period comprises storing vehicle information sensed by one or more sensors of the second vehicle over the collision reenactment period.

In Example 15, the subject matter of any of Examples 12-14 optionally comprises wherein storing information from the collision reenactment period comprises storing vehicle information corresponding to the collision reenactment period received from the one or more vehicles separate from the second vehicle.

In Example 16, the subject matter of any of Examples 12-15 optionally comprises wherein storing information from the collision reenactment period comprises storing vehicle information sensed by one or more sensors of the second vehicle over the collision reenactment period and vehicle information corresponding to the collision reenactment period received from the one or more vehicles separate from the second vehicle.

In Example 17, the subject matter of any of Examples 12-16 optionally comprises comprising: sensing information about the one or more vehicles using a first sensor; and sensing information about the second vehicle using a second sensor, wherein storing information from the collision reenactment period corresponding to the time of the detected collision in non-volatile memory comprises: storing sensed information about the one or more vehicles from the first sensor from the collision reenactment period in the non-volatile memory; and storing sensed information about the second vehicle using the second sensor from the collision reenactment period in the non-volatile memory.

In Example 18, the subject matter of any of Examples 12-17 optionally comprises wherein receiving vehicle information from the one or more vehicles comprises receiving vehicle information from a first vehicle, wherein receiving the indication of the detected collision comprises receiving the indication of the detected collision from the first vehicle, wherein storing information from the collision reenactment period comprises storing information.

In Example 19, the subject matter of any of Examples 12-18 optionally comprises wherein receiving vehicle information comprises receiving vehicle-to-vehicle information from the one or more vehicles in a vehicle-to-vehicle network using the communication circuit, wherein receiving the indication of the detected collision comprises receiving a notification of the detected collision from at least one of the one or more vehicles.

Example 20 is a system for retaining data at a first vehicle related to a detected collision, comprising: one or more processors; and a memory storing computer-executable instructions that, when executed, cause the one or more processors to control the system to perform operations comprising: storing first vehicle information about the first vehicle from a first sensor of the first vehicle in temporary storage of the first vehicle; storing second vehicle information about a second vehicle from a second sensor of the first vehicle in temporary storage of the first vehicle; storing information from the second vehicle using a communication circuit of the first vehicle in temporary storage of the first vehicle; receiving an indication of a detected collision of the first vehicle or the second vehicle, including a time of the detected collision; and responsive to the received indication of the detected collision: transitioning information corresponding to the detected collision from a collision reenactment period from temporary storage to permanent storage of the first vehicle; and broadcasting the information corresponding to the detected collision, wherein the information corresponding to the detected collision comprises first vehicle information, second vehicle information, and information from the second vehicle from the collision reenactment period, wherein the collision reenactment period comprises a period starting at least one minute before and ending at least one minute after a time of the detected collision.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

The above detailed description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the disclosure should, therefore, be determined with references to the appended claims, along with the full scope of equivalents to which such claims are entitled.

What is claimed is:

1. A method for retaining data at a first vehicle related to a detected collision, comprising:

receiving first vehicle information about the first vehicle from a first sensor of the first vehicle;

receiving second vehicle information about a second vehicle from a second sensor of the first vehicle;

receiving information from the second vehicle using a communication circuit of the first vehicle;

receiving an indication of a detected collision of the first vehicle or the second vehicle; and responsive to the received indication of the detected collision:

storing information corresponding to the detected collision from a collision reenactment period in non-volatile memory of the first vehicle;

receiving, at the first vehicle, and directly from the second vehicle, information corresponding to the detected collision from the collision reenactment period from the second vehicle;

storing the information corresponding to the detected collision from the collision reenactment period from the second vehicle in the non-volatile memory of the first vehicle; and broadcasting the information corresponding to the detected collision using the communication circuit, wherein the information corresponding to the detected collision comprises first vehicle information, second vehicle information, and the information corresponding to the detected collision from the collision reenactment period from the second vehicle from the collision reenactment period, wherein the collision reenactment period comprises a period starting at least one minute before and ending at least one minute after a time of the detected collision.

2. The method of claim 1, comprising:

sensing first vehicle information about the first vehicle using the first sensor; and sensing second vehicle information about the second vehicle using the second sensor, wherein receiving the indication of the detected collision comprises detecting a collision of the first vehicle using the first sensor or receiving an indication of a detected collision of the second vehicle using the communication circuit.

3. The method of claim 1, wherein storing information corresponding to the detected collision from the collision reenactment period in non-volatile memory of the first vehicle comprises transitioning information corresponding to the detected collision from temporary to permanent storage in the non-volatile memory, wherein the transition is triggered by the received indication of the detected collision.

4. The method of claim 1, wherein broadcasting the information corresponding to the detected collision includes broadcasting the information corresponding to the detected collision to one or more vehicles coupled to the communication circuit of the first vehicle or uploading the information corresponding to the detected collision to a cloud network.

5. A method for retaining data related to a detected collision of a first vehicle using nearby resources, comprising:

receiving, at a first vehicle, and directly from a second vehicle, an indication of a detected collision of the first vehicle; and responsive to the received indication of the detected collision of the first vehicle:

storing vehicle information of the first vehicle corresponding to the detected collision using an event data recorder on the second vehicle; and broadcasting information corresponding to the detected collision using a communication circuit of the first vehicle.

6. The method of claim 5, wherein broadcasting information corresponding to the detected collision comprises broadcasting a notification of the detected collision to other vehicles within a communication range of the communication circuit of the first vehicle.

7. The method of claim 5, wherein broadcasting information corresponding to the detected collision comprises broadcasting information from the event data recorder from an event time window corresponding to the detected collision using the communication circuit of the first vehicle.

8. The method of claim 7, wherein broadcasting information from the event data recorder corresponding to the detected collision using the communication circuit comprises broadcasting information for a first period following the detected collision.

9. The method of claim 8, wherein the event time window corresponding to the detected collision is less than the first period following the detected collision.

10. The method of claim 7, comprising:

detecting a collision of the first vehicle using information from one or more sensors of the first vehicle; and responsive to the detected collision, storing vehicle information from the event time window corresponding to the detected collision in non-volatile memory, wherein the vehicle information comprises information from the one or more sensors of the first vehicle, wherein broadcasting information corresponding to the detected collision comprises broadcasting information from the one or more sensors of the first vehicle.

11. The method of claim 5, comprising:

communicating with one or more vehicles within a communication range of the communication circuit, wherein broadcasting information from the event data recorder corresponding to the detected collision comprises broadcasting information to one or more vehicles coupled to the communication circuit of the first vehicle at a time of the detected collision, wherein the nearby resources comprise the one or more vehicles coupled to the communication circuit at the time of the detected collision.

12. A method for retaining data at a second vehicle related to a detected collision, comprising:

receiving, by the second vehicle, information directly from one or more vehicles separate from the second vehicle using a communication circuit;

receiving an indication of a detected collision from at least one of the one or more vehicles; and responsive to the received indication of the detected collision from the one or more vehicles, storing information from a collision reenactment period corresponding to a time of the detected collision in non-volatile memory on at least the one of the one or more vehicles.

13. The method of claim 12, wherein storing information from the collision reenactment period corresponding to the time of the detected collision in non-volatile memory comprises transitioning information from the collision reenactment period from temporary to permanent storage in the non-volatile memory.

14. The method of claim 12, wherein storing information from the collision reenactment period comprises storing vehicle information sensed by one or more sensors of the second vehicle over the collision reenactment period.

15. The method of claim 12, wherein storing information from the collision reenactment period comprises storing vehicle information corresponding to the collision reenactment period received from the one or more vehicles separate from the second vehicle.

16. The method of claim 12, wherein storing information from the collision reenactment period comprises storing vehicle information sensed by one or more sensors of the second vehicle over the collision reenactment period and vehicle information corresponding to the collision reenactment period received from the one or more vehicles separate from the second vehicle.

17. The method of claim 12, comprising:

sensing information about the one or more vehicles using a first sensor; and sensing information about the second vehicle using a second sensor, wherein storing information from the collision reenactment period corresponding to the time of the detected collision in non-volatile memory comprises:

storing sensed information about the one or more vehicles from the first sensor from the collision reenactment period in the non-volatile memory; and storing sensed information about the second vehicle using the second sensor from the collision reenactment period in the non-volatile memory.

18. The method of claim 12, wherein receiving vehicle information from the one or more vehicles comprises receiving vehicle information from a first vehicle, wherein receiving the indication of the detected collision comprises receiving the indication of the detected collision from the first vehicle, wherein storing information from the collision reenactment period comprises storing information.

19. The method of claim 12, wherein receiving vehicle information comprises receiving vehicle-to-vehicle information from the one or more vehicles in a vehicle-to-vehicle network using the communication circuit, wherein receiving the indication of the detected collision comprises receiving a notification of the detected collision from at least one of the one or more vehicles.

20. A system for retaining data at a first vehicle related to a detected collision, comprising:

one or more processors; and a memory storing computer-executable instructions that, when executed, cause the one or more processors to control the system to perform operations comprising:

storing first vehicle information about the first vehicle from a first sensor of the first vehicle in temporary storage of the first vehicle;

storing second vehicle information about a second vehicle from a second sensor of the first vehicle in temporary storage of the first vehicle;

storing information from the second vehicle using a communication circuit of the first vehicle in temporary storage of the first vehicle;

receiving an indication of a detected collision of the first vehicle or the second vehicle, including a time of the detected collision, directly from the first vehicle or the second vehicle; and responsive to the received indication of the detected collision:

transitioning information corresponding to the detected collision from a collision reenactment period from temporary storage to permanent storage of the first vehicle and the second vehicle; and broadcasting the information corresponding to the detected collision, wherein the information corresponding to the detected collision comprises first vehicle information, second vehicle information, and information from the second vehicle from the collision reenactment period, wherein the collision reenactment period comprises a period starting at least one minute before and ending at least one minute after a time of the detected collision.

* * * * *